(12) United States Patent  
Nagabuchi (10) Patent No.: US 7,322,729 B2  
(45) Date of Patent: Jan. 29, 2008

(54) LIGHT GUIDING UNIT, LIGHT GUIDING UNIT ASSEMBLY, AND LIGHTING DEVICE INCLUDING THE SAME

(75) Inventor: Daisuke Nagabuchi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 44 days.

(21) Appl. No.: 11/422,213

(22) Filed: Jun. 5, 2006

(65) Prior Publication Data

US 2006/0274621 A1    Dec. 7, 2006

(30) Foreign Application Priority Data

Jun. 6, 2005    (JP) .............................. 2005-166000

(51) Int. Cl.  
*F21V 7/04* (2006.01)

(52) U.S. Cl. ...................... 362/551; 362/327; 362/628; 385/901

(58) Field of Classification Search ................ 362/511, 362/551, 555, 610, 327, 628; 385/146, 901  
See application file for complete search history.

(56) References Cited

U.S. PATENT DOCUMENTS 6,679,621 B2 *  1/2004  West et al. .................. 362/327  
7,059,731 B2 *  6/2006  Lee et al. .................... 362/551

FOREIGN PATENT DOCUMENTS

JP        2003-317508        11/2003

\* cited by examiner

*Primary Examiner*—Stephen F Husar  
(74) *Attorney, Agent, or Firm*—Cermak Kenealy & Vaidya LLP (57) ABSTRACT

A light guide unit, a light guide unit assembly, and a lighting device are provided which can efficiently use light emitted from a light source and uniformly radiate light from an elongate rectangular radiating surface. The light guide unit has at least one radiation direction in a direction perpendicular to an optical axis of the light source.

22 Claims, 8 Drawing Sheets

LIGHT GUIDING UNIT, LIGHT GUIDING UNIT ASSEMBLY, AND LIGHTING DEVICE INCLUDING THE SAME

This application claims the priority benefit under 35 U.S.C. §119 of Japanese Patent Application No. 2005-166000 filed on Jun. 6, 2005, which is hereby incorporated in its entirety by reference.

BACKGROUND

1. Field of the Invention

The presently disclosed subject matter relates to a light guide unit, a light guide unit assembly, and a lighting device including the same.

2. Description of the Related Art

A lighting device that radiates light from an elongate rectangular light-emitting surface (radiating surface) is conventionally known. An example of this type of lighting device is described in Japanese Patent Laid-Open Publication No. 2003-317508 (hereinafter, this type of lighting device is referred to as a "conventional lighting device").

More specifically, FIGS. 3 and 4 of the above-referenced Japanese reference publication show a conventional lighting device in which a first reflecting surface reflects light emitted from a light source toward a direction perpendicular to the optical axis of the light source. A second reflecting surface is provided to surround the light source in order to efficiently use the light emitted from the light source. The second reflecting surface reflects the light emitted from the light source toward a direction along the optical axis of the light source.

That is, in the conventional lighting device described above, the light emitted from the light source is directed along the optical axis of the light source directly or by the second reflecting surface. This light is then reflected by the first reflecting surface toward the direction perpendicular to the optical axis of the light source. Consequently, the light is radiated from an entire surface of the elongate rectangular light-emitting surface (radiating surface) of the conventional lighting device. The radiating surface is longer in the optical-axis direction and is shorter in the direction perpendicular to the optical axis (i.e., in a diameter direction of the second reflecting surface).

In this conventional lighting device, a length of the shorter side of the rectangular light-emitting surface (radiating surface) is set to be relatively larger, i.e., approximately as large, as a diameter of the second reflecting surface. Thus, the conventional lighting device can use the light emitted from the light source relatively efficiently. However, in this structure, if the length of the shorter side of the light-emitting surface (radiating surface) is set to be smaller than the diameter of the second reflecting surface in order to make the light-emitting surface (radiating surface) more elongate, it may not be possible to use a part of the light emitted from the light source (which part is emitted from right and left sides of the light source when the light source is seen from a radiation direction). In other words, only (or substantially only) a central part of the light that corresponds to a width of the shorter side of the light-emitting surface can be used. Therefore, light-use efficiency may be significantly reduced.

SUMMARY

One aspect of the presently disclosed subject matter is to provide a light guide unit, a light guide unit assembly, and a lighting device including the same, which can efficiently use light emitted from a light source and radiate the light from an entire surface of an elongate rectangular radiating surface.

According to another aspect of the disclosed subject matter, a light guide unit can have at least one radiation direction in a direction perpendicular to an optical axis of a light source. The light guide unit may include: a first reflecting portion that faces the light source and includes a plurality of reflecting surfaces for reflecting light incident thereon toward a plurality of directions perpendicular to the optical axis; a forward reflecting portion for reflecting light that is reflected approximately toward the radiation direction by the first reflecting portion, toward the radiation direction as a forward direction; a backward reflecting portion for reflecting light that is reflected toward a direction opposite to the radiation direction as a backward direction by the first reflecting portion, toward the radiation direction; and a radiating portion having at least one rectangular radiating surface having a small width in the optical axis direction, wherein all of the light from the forward reflecting portion and the light from the backward reflecting portion are directed toward the radiation direction so that the radiating portion radiates the light from its entire surface.

In the light guide unit, the first reflecting portion may include four or more reflecting surfaces for reflecting light incident thereon toward respective four or more directions. Furthermore, the forward reflecting portion may include: a second reflecting portion having a reflecting surface for reflecting light that is reflected by the first reflecting portion forward on the right when the light guide unit is seen from the radiation direction, toward the radiation direction; and a third reflecting portion having a reflecting surface for reflecting light that is reflected forward on the left by the first reflecting portion, toward the radiation direction. The backward reflecting portion may include: a fourth reflecting portion having a reflecting surface for reflecting light that is reflected by the first reflecting portion back on the right, toward the radiation direction; and a fifth reflecting portion having a reflecting surface for reflecting light that is reflected by the first reflecting portion back on the left, toward the radiation direction. Furthermore, the radiating portion may include a second radiating surface, a third radiating surface, a fourth radiating surface, and a fifth radiating surface for radiating the light from the second reflecting portion, the light from the third reflecting portion, the light from the fourth reflecting portion, and the light from the fifth reflecting portion, respectively.

The light guide unit can include a first reflecting portion that has a plurality of reflecting surfaces for reflecting light emitted from a light source toward a plurality of directions perpendicular to an optical axis of the light source in a radial manner and is provided to face the light source. Due to this, the light emitted from the light source can be used and reflected efficiently.

In the light guide unit, the light reflected toward the plurality of directions in the radial manner can be further reflected by a forward reflecting portion and a backward reflecting portion toward a radiation direction. Therefore, the light can be radiated from the entire surface of a rectangular radiating portion that is provided in the radiation direction and can have a smaller width in an up-and-down direction than a width in a right-to-left direction.

Thus, it is possible to more efficiently use the light emitted from the light source as compared with the conventional lighting devices, and to radiate the light from the rectangular radiating surface that is more elongate than that in the conventional lighting device.

The light guide unit may be configured such that the first and second optically insulating portions are formed from a material having a different refractive index from that of a material forming the light paths of the light guide unit. In the light guide unit, the first and second optically insulating portions may be formed by air as a medium.

In other words, in the light guide unit, the reflecting surfaces of the second and third reflecting portions can be formed by arranging first and second optically insulating portions (such as open spaces).

Thus, it is possible to optically separate a light path extending from the first reflecting portion to the radiating portion via the second reflecting portion and a light path extending from the first reflecting portion to the radiating portion via a fourth reflecting portion from each other without forming the second reflecting portion and the fourth reflecting portion from separate members. Moreover, it is also possible to optically separate a light path extending from the first reflecting portion to the radiating portion via the third reflecting portion and a light path extending from the first reflecting portion to the radiating path via a fifth reflecting portion from each other without forming the third reflecting portion and the fifth reflecting portion from separate members.

In other words, the light path extending from the first reflecting portion to the radiating portion via the second reflecting portion, the light path extending from the first reflecting portion to the radiating portion via the third reflecting portion, the light path extending from the first reflecting portion to the radiating portion via the fourth reflecting portion, and the light path extending from the first reflecting portion to the radiating portion via the fifth reflecting portion can be formed by a single member.

Moreover, in the light guide unit, one of the plurality of reflecting surfaces of the first reflecting portion can be a reflecting surface for reflecting light incident thereon toward the radiation direction, and it is also possible that this reflecting surface be arranged between the second reflecting portion and the third reflecting portion. Due to this, an area of a radiating surface that radiates horizontal light forward can be made larger, as compared with the case where a reflecting surface for reflecting the light emitted from the light source forward is not provided between the second reflecting portion and the third reflecting portion.

In the light guide unit, the reflecting surface of the fourth reflecting portion can include a reflecting surface for reflecting light that is reflected back on the right by the first reflecting portion ahead on the right approximately toward the radiation direction, and a reflecting surface for reflecting the light that is reflected approximately toward the radiation direction, toward the radiation direction. The reflecting surface of the fifth reflecting portion can include a reflecting surface for reflecting light that is reflected back on the left by the first reflecting portion ahead on the left approximately toward the radiation direction and a reflecting surface for reflecting the light that is reflected approximately toward the radiation direction, toward the radiation direction. Due to this, it is possible to make a dimension of the radiating surface in the right-to-left direction larger while reducing a depth of the entire light guide unit, as compared with the case where only one reflecting surface is provided in the fourth reflecting portion and only one reflecting surface is provided in the fifth reflecting portion. That is, it is possible to radiate light from the radiating surface that has a larger width in the right-to-left direction while reducing the depth of the entire light guide unit.

In the light guide unit, at least one of the second, third, fourth, and fifth radiating surfaces may be formed by a different plane from a plane forming another one of the second, third, fourth, and fifth radiating surfaces. Namely, the radiating portion may be formed by the same plane or different planes. The fourth radiating surface may be located behind the second radiating surface. Moreover, the fifth radiating surface may be located behind the third radiating surface. In this case, the amount of a material required for manufacturing the light guide unit can be reduced as compared with the case where the radiating surfaces are arranged on the same plane.

The radiating surface for radiating the light that is reflected forward or forward on the right by the fourth reflecting portion can be arranged at a front edge of the reflecting surface for reflecting horizontal light from the reflecting surface that reflects the horizontal light reflected back on the right by the first reflecting portion forward on the right, forward or forward on the right.

The radiating surface for radiating the light that is reflected forward or forward on the left by the fifth reflecting portion can be arranged behind the radiating surface for radiating the light that is reflected forward by the third reflecting portion. The radiating surface for radiating the light that is reflected forward or forward on the left by the fifth reflecting portion can be arranged at a front edge of the reflecting surface for reflecting horizontal light from the reflecting surface that reflects the horizontal light that is reflected back on the left by the first reflecting portion forward on the left, forward or forward on the left. In this case, it is also possible to reduce the amount of the material required for manufacturing the light guide unit as compared with the case where the radiating surfaces are arranged on the same plane.

In the light guide unit of the disclosed subject matter, the radiating surface for radiating the light that is reflected forward by the reflecting surface arranged between the second and third reflecting portions can be arranged behind the radiating surface for radiating the light that is reflected forward by the second or third reflecting portion. The radiating surface for radiating the light that is reflected forward by the reflecting surface arranged between the second and third reflecting surfaces can be arranged at a front edge of the reflecting surface arranged between the second and third reflecting portions. In this case, it is also possible to reduce the amount of the material required for manufacturing the light guide unit as compared with the case where the radiating surfaces are arranged on the same plane.

According to a light guide unit assembly in which a plurality of the aforementioned light guide units are arranged in the right-to-left direction or the up-and-down direction, it is possible to more efficiently use light emitted from a light source as compared with the conventional lighting devices, and to radiate the light from a rectangular radiating surface that is more elongate than that in the conventional lighting devices. Furthermore, the disclosed subject matter can provide light guide units and lighting devices that employ the same light guide units that each has improved aesthetic appearances.

According to a lighting device including the light guide unit or light guide unit assembly of the disclosed subject matter, it is possible to more efficiently use light emitted from a light source than in conventional lighting devices, and to radiate the light from a rectangular radiating surface that is more elongate than that in the conventional lighting devices.

BRIEF DESCRIPTION OF THE DRAWINGS

These and other characteristics, features and advantages of the disclosed subject matter will become clear from the following description with reference to the accompanying drawings, wherein.

DETAILED DESCRIPTION OF EXEMPLARY EMBODIMENTS

A light guide unit according to a first exemplary embodiment of the disclosed subject matter will now be described with reference to FIGS. 1A to 5. In the description, an up-and-down direction is defined assuming a state where a light-emitting direction of an LED unit is an upward direction. A back-to-forth direction is defined assuming a state where a side on which a radiating surface 6 is located is a front side (also radiation direction) as a reference. Moreover, a right-to-left direction is defined in such a manner that a light guide unit is seen from a radiating-surface side (or the front side) of the light guide unit as a reference.

In the drawings, a light source S is formed by an LED unit including an LED chip (not shown). The reference character L denotes an optical axis of the light source S extending in the up-and-down direction. Five reflecting surfaces 1a, 1b, 1c, 1d, and 1e form a first reflecting portion. The thus formed first reflecting portion reflects light emitted from the light source toward five directions perpendicular to the optical axis L in a radial manner. Each of the reflecting surfaces 1a, 1b, 1c, 1d, and 1e reflects the emitted light from the light source to change it into parallel light that travels toward the corresponding direction perpendicular to the optical axis L. In order to achieve the desired reflection, each reflecting surface can be formed by a paraboloid obtained by rotating a parabola around a predetermined axial line. Moreover, each of the reflecting surfaces 1a, 1b, 1c, 1d, and 1e can be designed to achieve total reflection of light incident thereon from the light source. Thus, each of the reflecting surfaces 1a, 1b, 1c, 1d, and 1e can have a focus where the light-emitting center of the light source should be located.

More specifically, a right front part of light emitted upward from the light source is reflected by the reflecting surface 1a forward on the right, a left front part of that emitted light is reflected by the reflecting surface 1b forward on the left, a right rear part of that emitted light is reflected by the reflecting surface 1c rearward on the right, and a left rear part of that emitted light is reflected by the reflecting surface 1d rearward on the left. A front part of the emitted light is reflected by the reflecting surface 1e forward.

In the drawings, the reference numerals 2, 3, 4, 4', 5, and 5' denote other reflecting surfaces. The reflecting surface 2 forms a second reflecting portion for reflecting horizontal light that is reflected forward on the right by the reflecting surface 1a forward. The reflecting surface 3 forms a third reflecting portion for reflecting horizontal light that is reflected forward on the left by the reflecting surface 1b forward. The reflecting surface 4 reflects horizontal light that is reflected back on the right by the reflecting surface 1c to a direction forward on the right, and the reflecting surface 4' then reflects the horizontal light that is reflected forward on the right by the reflecting surface 4, to a forward direction. The reflecting surfaces 4 and 4' form together a fourth reflecting portion. The reflecting surface 5 reflects horizontal light that is reflected back on the left by the reflecting surface 1d to a direction forward on the left, and the reflecting surface 5' then reflects the horizontal light that is reflected forward on the left by the reflecting surface 5, to a forward direction. The reflecting surfaces 5 and 5' form together a fifth reflecting portion. Each of the reflecting surfaces 2, 3, 4, 4', 5, and 5' can be formed by a flat plane, although the construction is not limited thereto. Moreover, each of the reflecting surfaces 2, 3, 4, 4', 5, and 5' can be designed to achieve total reflection of light incident thereon.

Figure 1A:
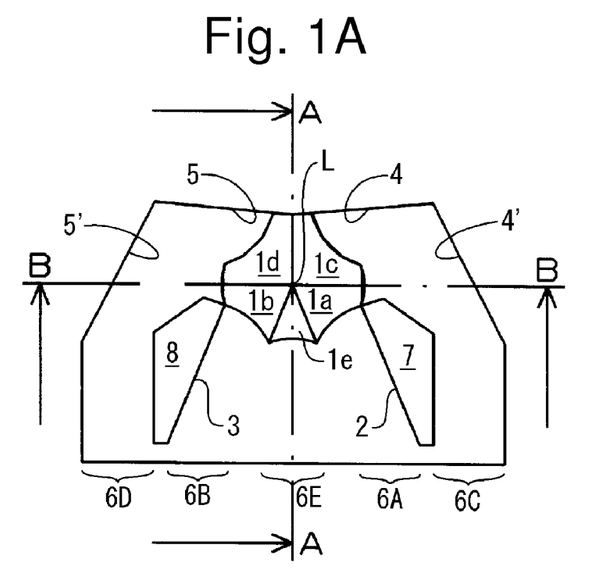
FIGS. 1A to 1C show an embodiment of a light guide unit with LED unit made in accordance with principles of the disclosed subject matter, FIG. 1A being a plan view thereof, FIG. 1B being a cross-sectional view thereof, taken along the line A-A in FIG. 1A, and FIG. 1C being a cross-sectional view thereof, taken along the line B-B in FIG. 1A.
Figure 2A:
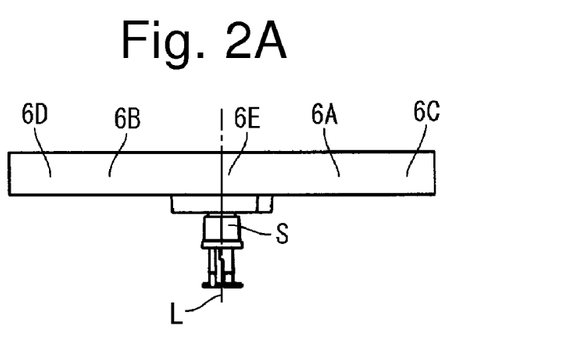
FIGS. 2A to 2C show the light guide unit with the LED unit of FIG. 1, with FIG. 2A being a front view thereof, FIG. 2B being a left side view thereof, and FIG. 2C being a back view thereof.
Figure 2B:
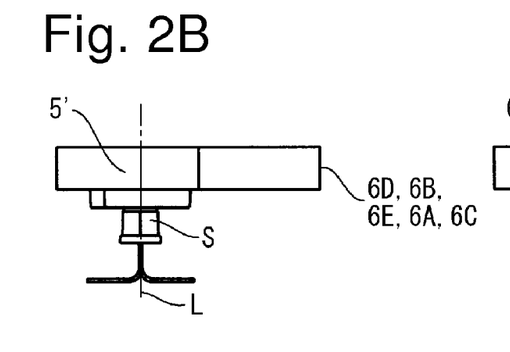
Figure 2C:
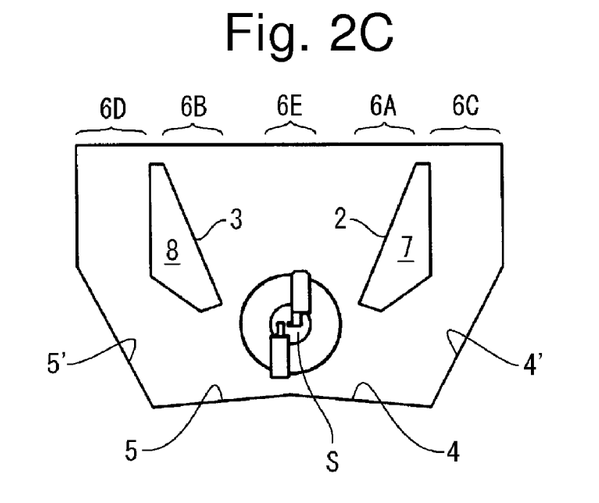
Figure 3:
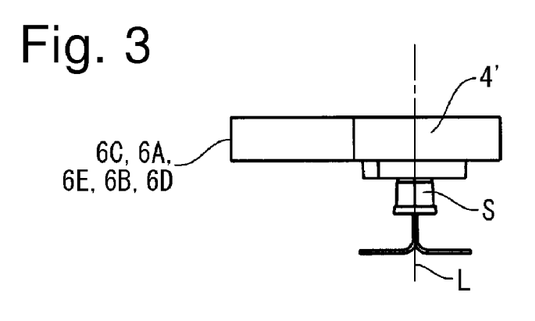
FIG. 3 is a right side view of the light guide unit with the LED unit of FIG. 1.
Figure 4:
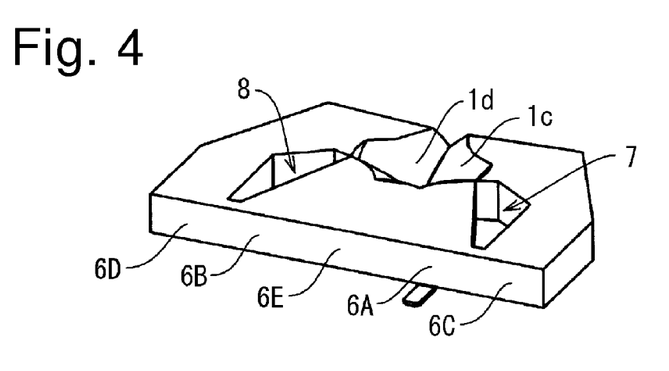
FIG. 4 is a perspective view of the light guide unit and the LED unit of FIG. 1.

A radiating surface 6 includes radiating surfaces 6A, 6B, 6C, 6D, and 6E, as shown in the drawings. The radiating surface 6A radiates horizontal light from the reflecting surface 2 forward. The radiating surface 6B radiates horizontal light from the reflecting surface 3 forward. The radiating surface 6C radiates horizontal light from the reflecting surface 4' forward. The radiating surface 6D radiates horizontal light from the reflecting surface 5' forward. The radiating surface 6E radiates the horizontal light from the reflecting surface 1e forward. In the light guide unit of this embodiment, the radiating surfaces 6A, 6B, 6C, 6D, and 6E are arranged on the same plane and are formed by a single plane, as shown in FIGS. 1A and 2A. Moreover, the radiating surfaces 6A, 6B, 6C, 6D, and 6E form a radiating portion in the light guide unit for this particular exemplary embodiment. The radiating portion can be formed in a rectangular shape that has a smaller width in the up-and-down direction and has a larger width in the right-to-left direction, as shown in FIG. 2A.

The material forming the light guide unit of the disclosed subject matter should have a high transmittance in order to guide the incident light to the radiating surface without loss. Examples of the material for the light guide unit include plastics such as polycarbonate, acrylic resin, and the like, and glass materials.

The reference numerals 7 and 8 denote optically insulating portions in the drawings. The insulating portion 7 is arranged between the reflecting surface 2 and the reflecting surfaces 4 and 4'. The insulating portion 8 is arranged between the reflecting surface 3 and the reflecting surfaces 5 and 5'. The material for the insulation portion should have an optically insulating function when being interposed between the adjacent portions, and, for example, is air in the exemplary embodiment of FIG. 1.

Figure 5:
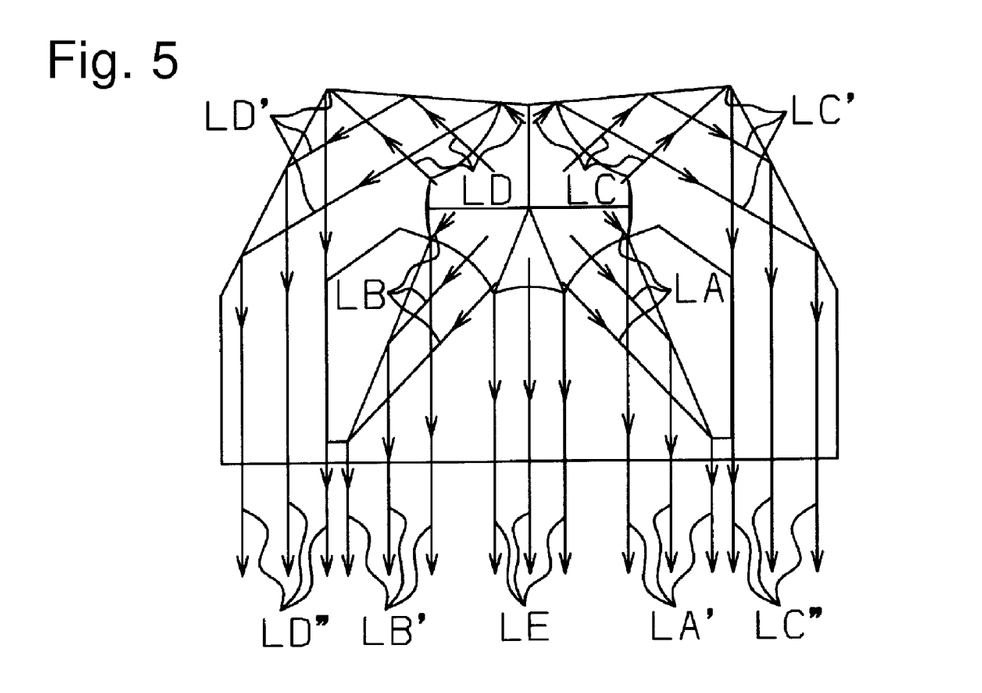
FIG. 5 is a diagram showing light paths in the light guide unit of FIG. 1.

FIG. 5 shows light path portions in the light guide unit corresponding to FIG. 1A. Thus, the respective reflecting surfaces in FIG. 1A correspond to positions of reflection in the light paths in FIG. 5. In FIG. 5, a light path LA is a light path of light that is reflected by the reflecting surface 1a and travels forward on the right, and a light path LA' is a light path of the light that is further reflected by the reflecting surface 2 and travels forward. A light path LB is a light path of light that is reflected by the reflecting surface 1b and travels forward on the left, and a light path LB' is a light path of the light that is further reflected by the reflecting surface 3 and travels forward.

Furthermore, in FIG. 5, a light path LC is a light path of light that is reflected by the reflecting surface 1c and travels back on the right, a light path LC' is a light path of the light that is further reflected by the reflecting surface 4 and travels forward on the right, and a light path LC" is a light path of the light that is further reflected by the reflecting surface 4' and travels forward. A light path LD is a light path of light that is reflected by the reflecting surface 1d and travels back on the left, a light path LD' is a light path of the light that is further reflected by the reflecting surface 5 and travels forward on the left, and a light path LD" is a light path of the light that is further reflected by the reflecting surface 5' and travels forward. A light path LE is a light path of light that is reflected by the reflecting surface 1e and travels forward.

That is, in the light guide unit of FIG. 1, the optically insulating portion 7 is arranged between a light path extending from the reflecting surface 1a to the radiating surface 6A via the reflecting surface 2 (LA to LA') and a light path extending from the reflecting surface 1c to the radiating surface 6C via the reflecting surfaces 4 and 4' (LC to LC" via LC'), as shown in FIGS. 1A and 5. Furthermore, the reflecting surface 2 is formed by a boundary between the optically insulating portion 7 and the material forming the light guide unit. In addition, the optically insulating portion 8 is arranged between a light path extending from the reflecting surface 1b to the radiating surface 6B via the reflecting surface 3 (LB to LB') and a light path extending from the reflecting surface 1d to the radiating surface 6D via the reflecting surfaces 5 and 5' (LD to LD" via LD'). The reflecting surface 3 is formed by a boundary between the optically insulating portion 8 and the material forming the light guide unit.

As shown in FIGS. 1A to 5, a light guide unit can be configured in such a manner that parts of light emitted upward from the light source having the optical axis L extending in the up-and-down direction, which are radiated forward on the right, back on the right, forward on the left, back on the left, and forward, respectively, are reflected by the reflecting surfaces 1a, 1b, 1c, 1d, and 1e toward directions that are perpendicular to the optical axis L (i.e., horizontal directions) and forward on the right, back on the right, forward on the left, back on the left, and forward, respectively. Therefore, the light emitted from the light source can be used and reflected efficiently.

Moreover, the light beams reflected by the reflecting surfaces 1a, 1b, 1c, and 1d toward the directions perpendicular to the optical axis L (i.e., the horizontal directions) and forward on the right, back on the right, forward on the left, and back on the left, respectively, are further reflected by the reflecting surfaces 2, 3, 4 and 4', and 5 and 5', and are then directed ahead along corresponding light paths. The reflecting surface 1e is arranged between the reflecting surface 2 and the reflecting surface 3, more specifically, between the reflecting surface 1a and the reflecting surface 1b.

The light rays thus directed ahead travel the corresponding light paths LA', LB', LC", LD", and LE and are then radiated from the corresponding radiating surfaces 6A, 6B, 6C, 6D, and 6E of the single rectangular radiating portion that has a smaller width in the up-and-down direction and a larger width in the right-to-left direction.

That is, the width of the radiating surface of the light guide unit having the above configuration can be set to be narrower irrespective of a size of the light source and a size of a reflecting surface associated therewith. According to the disclosed subject matter, it is possible to provide a lighting device that can efficiently use the light emitted from the light source and can include a radiating surface having a narrower width.

In addition, in the light guide unit of FIG. 1, the optically insulating portion 7 is arranged between the light path LA to LA' that extends from the reflecting surface 1a to the radiating surface 6A via the reflecting surface 2 and the light path LC to LC" via LC' that extends from the reflecting surface 1c to the radiating surface 6C via the reflecting surfaces 4 and 4'. That is, the above two light paths (LA to LA' and LC to LC" via LC') can be optically separated from each other without forming the reflecting surfaces (reflecting portions) of the two light paths from separate members. This can be the same for the left half of the light guide unit of this embodiment, and therefore the detailed description of the left half is omitted.

In other words, according to the light guide unit of FIG. 1, the light path (LA to LA'), the light path (LB to LB'), the light path (LC to LC" via LC'), and the light path (LD to LD" via LD') can be formed by a single member.

Furthermore, in the light guide unit of FIG. 1, the reflecting surface 4 on which horizontal light traveling from the reflecting surface 1c of the first reflecting portion along the light path LC is incident and the reflecting surface 4' on which that horizontal light traveling from the reflecting surface 4 along the light path LC' is incident are provided as the fourth reflecting portion. Therefore, as compared with the case where only one reflecting surface is provided in the fourth reflecting portion, a dimension in the right-to-left direction of the radiating surface 6C of the radiating portion can be made larger while a depth of the entire light guide unit (a dimension in the back-to-forth direction in the drawings) can be made smaller. This can be the same for the left half of the light guide unit and therefore the detailed description of the left half is omitted.

The reflecting surface 1e for reflecting light emitted from the light source forward is provided in the first reflecting portion and is arranged between the reflecting surface 2 of the second reflecting portion and the reflecting surface 3 of the third reflecting portion, as shown in FIG. 1A. Therefore, an area of the radiating surface 6E that radiates horizontal light passing via the light path LE (see FIG. 5) forward can be made larger, as compared with the case where the reflecting surface 1e for reflecting the light emitted from the light source forward is not arranged between the reflecting surface 2 of the second reflecting portion and the reflecting surface 3 of the third reflecting portion.

A light guide unit according to another embodiment of the disclosed subject matter is now described. A basic structure of the light guide unit of the embodiment shown in FIG. 6 is substantially the same as that of the exemplary embodiment shown in FIG. 1. Thus, the same or similar effects as those obtained by the aforementioned light guide unit of FIG. 1 can be obtained and additional features can be achieved by the embodiment of FIG. 6 as described below.

Figure 6A:
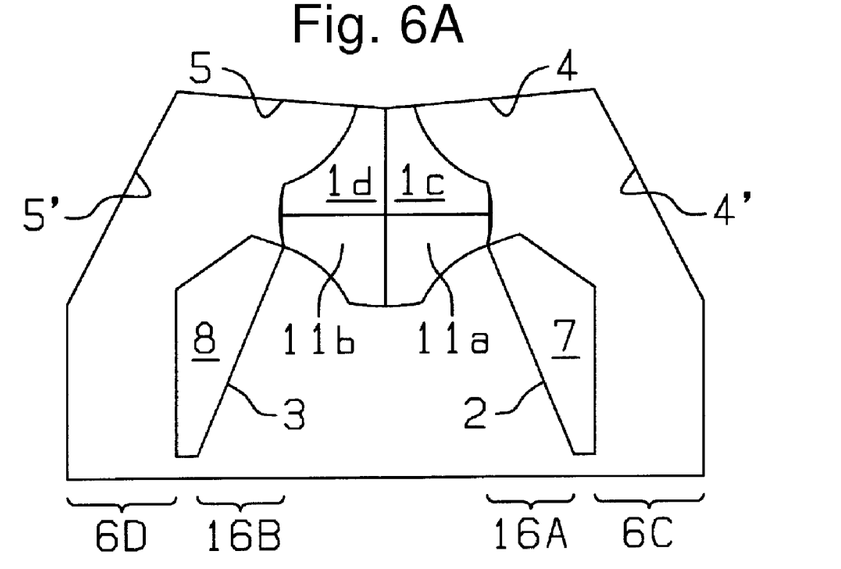
FIG. 6A is a plan view of another embodiment of a light guide unit with LED unit made in accordance with principles of the disclosed subject matter.
Figure 6B:
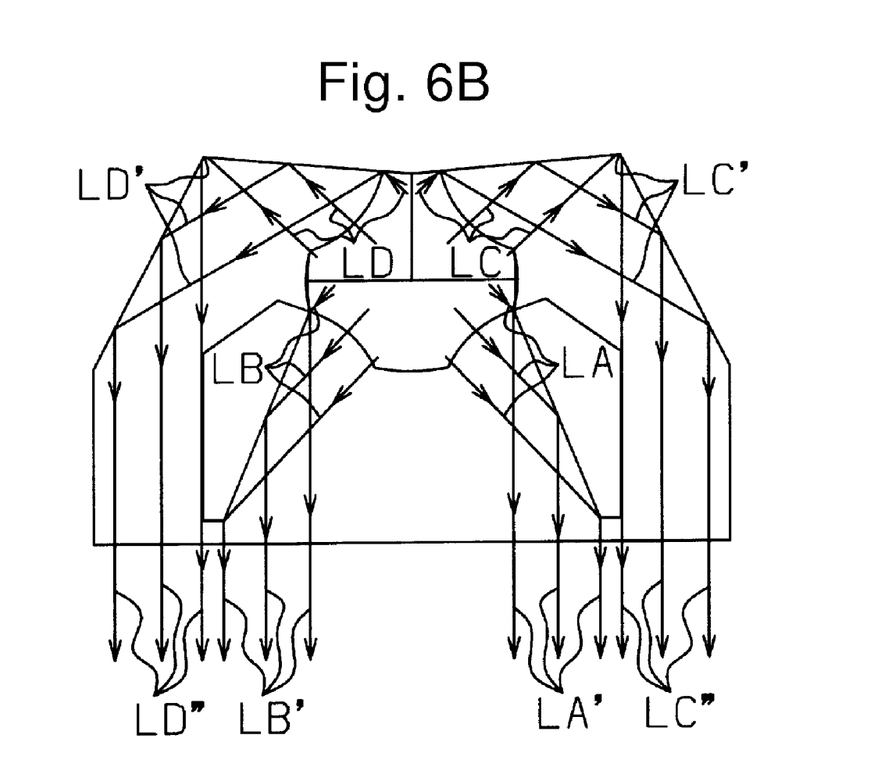
FIG. 6B is a diagram showing light paths in the light guide unit of FIG. 6A.

FIG. 6A is a plan view of a light guide unit and FIG. 6B shows light paths as they travel through light path portions in the light guide unit. In FIGS. 6A and 6B, the same or similar parts as those in FIGS. 1A to 5 are labeled with the same reference numerals as those in FIGS. 1A to 5.

Reflecting surfaces 11a and 11b are shown in FIG. 6A. The reflecting surface 11a reflects light that is emitted from a light source upward and ahead of the light source to the right, to a direction ahead on the right. The reflecting surface 11b reflects light that is emitted from the light source upward and ahead of the light source to the left, to a direction ahead on the left. Each of the reflecting surfaces 11a and 11b can be formed by a paraboloid obtained by rotating a parabola around a predetermined axial line in order to change the emitted light from the light source incident thereon to parallel light. Each of the reflecting surfaces 11a and 11b can be designed to achieve total reflection of the light incident thereon from the light source. In FIG. 6, the reflecting surface 1e that reflects light forward in the embodiment of FIG. 1 is not provided between the reflecting surfaces 11a and 11b.

Radiating surfaces 16A and 16B can be provided at the front of the light guide unit to correspond to the reflecting surfaces 11a and 11b shown in FIG. 6A, respectively. Horizontal light traveling from the reflecting surface 2 along the light path LA' is radiated from the radiating surface 16A forward, while horizontal light traveling from the reflecting surface 3 along the light path LB' is radiated from the radiating surface 16B forward. The radiating surfaces 16A, 16B, 6C, and 6D can be arranged on substantially the same plane, and thus a single plane can form the radiating portion. The radiating portion can also be formed in a rectangular shape that has a smaller width in the up-and-down direction and a larger width in the right-to-left direction, like the radiating portion of the light guide unit of the embodiment of FIG. 1.

As shown in FIGS. 6A and 6B, the reflecting surface 1e (see FIG. 1A) is not arranged between the reflecting surfaces 2 and 3 in the light guide unit of FIGS. 6A and 6B. That is, the reflecting surfaces 11a and 11b are arranged to be adjacent to each other. Therefore, there is no radiating surface 6E (see FIG. 1A) for radiating horizontal light passing through the light path LE (see FIG. 5) in the light guide unit of FIGS. 6A and 6B.

Except as described above, the light guide unit of FIGS. 6A and 6B can have the same or similar structure as that of the exemplary embodiment shown in FIGS. 1A to 5.

In the embodiment of FIGS. 6A and 6B, the reflecting surfaces 11a and 11b can be provided at the position corresponding to the reflecting surface 1e provided in the exemplary embodiment of FIG. 1. The light rays reflected from the reflecting surfaces 11a and 11b travel along/through the respective light path portions and are radiated from the radiating surfaces 16A and 16B that are located away from each other, respectively. However, the disclosed subject matter is not limited thereto. The radiating surfaces 16A and 16B can be arranged to be adjacent to each other by designing directions of reflection from the reflecting surfaces 11a and 11b using differently shaped surfaces, such as a free-curved surface. In this case, it is possible to provide a light guide unit that radiates light from the radiating surfaces 6D, 16B, 16A, and 6C in a continuous manner.

Figure 7A:
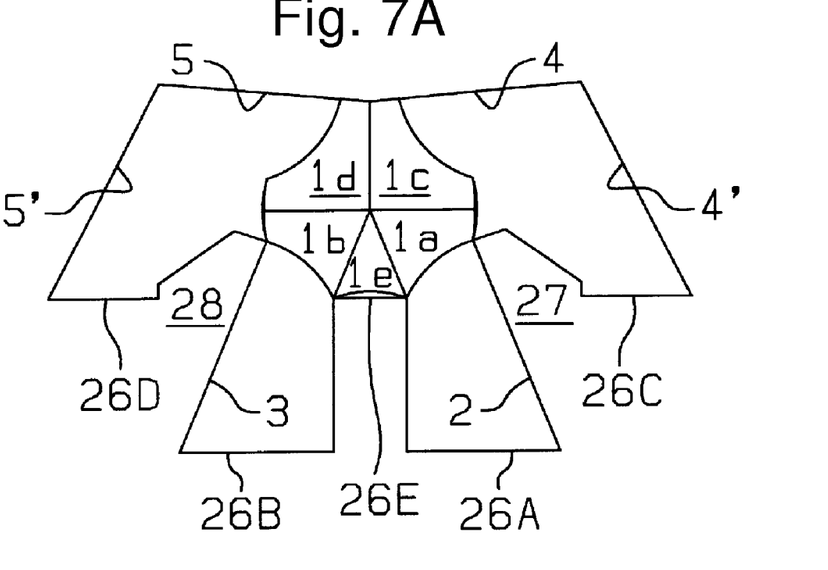
FIG. 7A is a plan view of another embodiment of a light guide unit with LED unit made in accordance with principles of the disclosed subject matter.
Figure 7B:
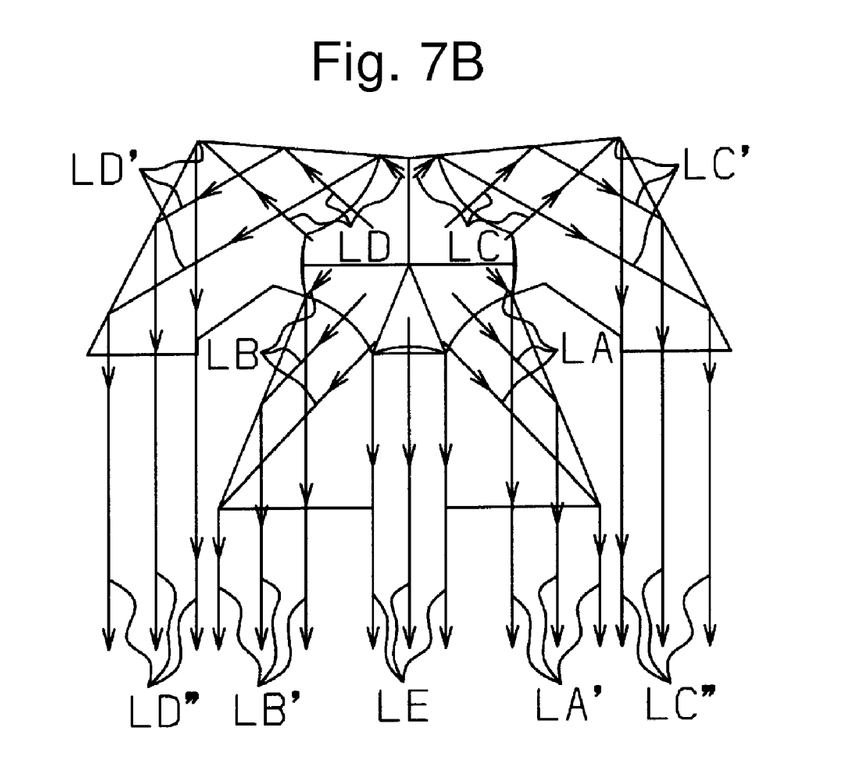
FIG. 7B is a diagram showing light paths in the light guide unit of FIG. 7A.

A light guide unit according to another exemplary embodiment of the disclosed subject matter will now be described with respect to FIGS. 7A and 7B. A basic structure of the light guide unit of the embodiment of FIGS. 7A and 7B is substantially the same as that of the exemplary embodiment described above with respect to FIG. 1. Therefore, according to the light guide unit of the exemplary embodiment of FIGS. 7A and 7B, substantially the same effects as those obtained by the aforementioned light guide unit of the exemplary embodiment of FIG. 1 can be obtained, and additional features can also be achieved by the exemplary embodiment of FIGS. 7A and 7B as described below.

FIG. 7A is a plan view of an exemplary light guide unit and FIG. 7B shows light paths corresponding to light path portions in the light guide unit. In FIGS. 7A and 7B, the same or similar parts as those shown in FIGS. 1A to 5 are labeled with the same reference numerals as those in FIGS. 1A to 5.

Radiating surfaces 26A to 26E are shown in FIG. 7A. From the radiating surfaces 26A, 26B, 26C, 26D, and 26E, substantially horizontal light rays that travel from the reflecting surfaces 2, 3, 4', 5' and 1e along the light paths LA', LB', LC", LD", and LE are radiated forward, respectively.

The radiating surfaces 26A, 26B, 26C, 26D, and 26E can be arranged in different planes, as shown in FIG. 7A. In other words, a plurality of planes formed by the radiating surfaces 26A, 26B, 26C, 26D, and 26E can form the radiating portion. A width in the up-and-down direction of the radiating portion of the light guide unit of the exemplary embodiment of FIGS. 7A and 7B may be set in the same manner as that of the width in the up-and-down direction of the radiating portion of the light guide unit of the exemplary embodiment shown in FIG. 2A, although it is not shown. In this case, a distribution of radiated light from a front surface of the light guide unit can be approximately the same as that from the light guide unit shown in FIG. 2A. Moreover, the plurality of radiating surfaces may be designed to have different widths in accordance with a purpose of the light guide unit.

In FIG. 7A, an optically insulating portion 27 is arranged between the reflecting surface 2 and the reflecting surfaces 4 and 4', and an optically insulating portion 28 is arranged between the reflecting surface 3 and the reflecting surfaces 5 and 5'. In this exemplary embodiment, the material forming the optically insulating portions 27 and 28 is air. In other words, the reflecting surface 2 is separated from the reflecting surfaces 4 and 4' by the optically insulating portion 27, and the reflecting surface 3 is separated from the reflecting surfaces 5 and 5' by the optically insulating portion 28.

The radiating surface 26C can be arranged behind the radiating surface 26A, as shown in FIG. 7A. More specifically, the radiating surface 26C can be arranged at a front edge of the reflecting surface 4'. Therefore, according to the light guide unit of the exemplary embodiment of FIGS. 7A and 7B, the amount of the material required for manufacturing the light guide unit can be reduced, as compared with the light guide unit of the exemplary embodiment as shown in FIG. 1A in which the radiating surface 6C is arranged in the same plane as the radiating surface 6A. This is the same for a left half and a central part of the light guide unit of the exemplary embodiment of FIGS. 7A and 7B and therefore the description thereof is omitted.

Although the light guide unit shown in FIG. 7A has a symmetrical shape, the construction is not limited thereto. For example, in only the right half or the left half, the radiating surfaces can be formed in the same plane as in the structure shown in FIG. 1A or other planes.

A light guide unit according to another exemplary embodiment will now be described with respect to FIGS. 8A and 8B. The basic structure of the light guide unit of the exemplary embodiment of FIGS. 8A and 8B can be the same as that of the exemplary embodiment of FIG. 1 described above. Therefore, the same effects obtained by the light guide unit of the exemplary embodiment of FIG. 1 described above can be obtained, and additional features can be achieved by the exemplary embodiment of FIGS. 8A and 8B as described below.

Figure 8A:
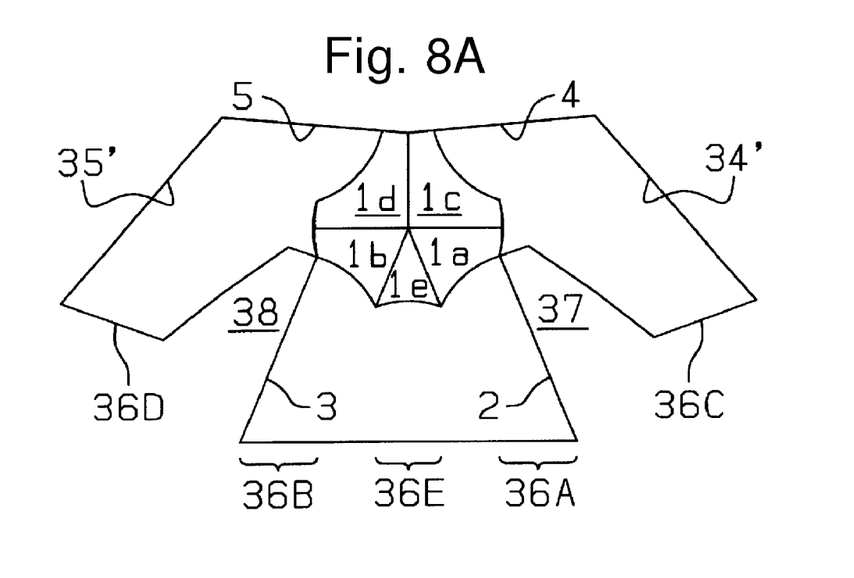
FIG. 8A is a plan view of another embodiment of a light guide unit with LED unit made in accordance with principles of the disclosed subject matter.
Figure 8B:
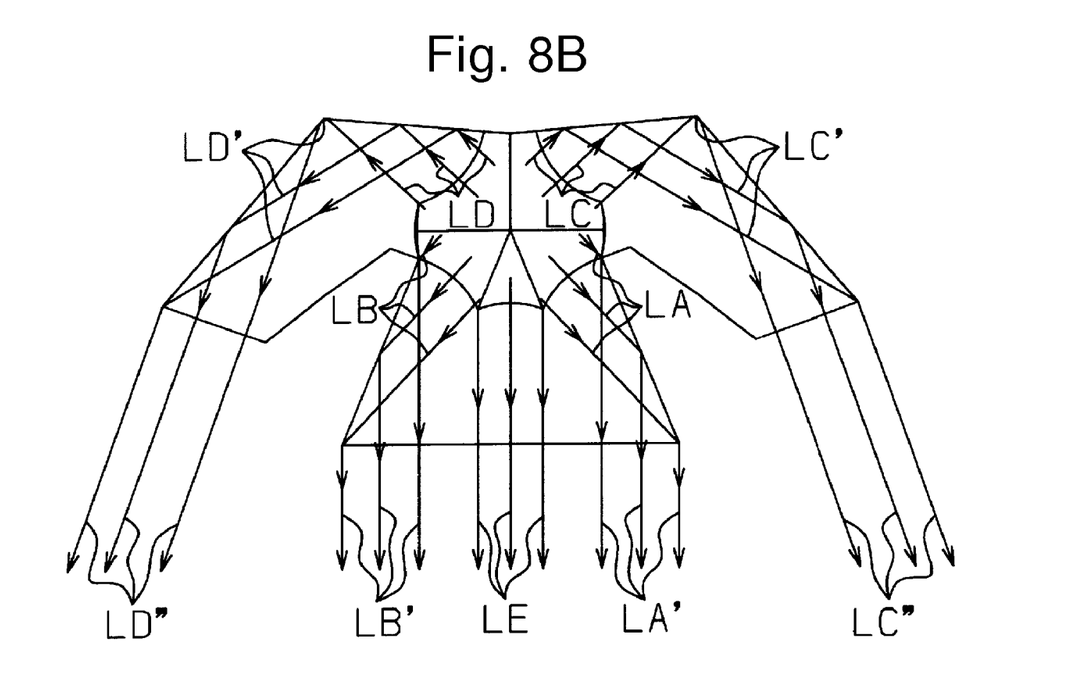
FIG. 8B is a diagram showing light paths in the light guide unit of FIG. 8A.

FIG. 8A is a plan view of another exemplary light guide unit and FIG. 8B shows light paths that correspond to light path portions in the light guide unit. In FIGS. 8A and 8B, the same or similar parts as those in FIGS. 1A to 5 are labeled with the same reference numerals as those in FIGS. 1A to 5.

Radiating surfaces 36A to 36E are shown in FIG. 8A. From the radiating surfaces 36A, 36B, 36C, 36D, and 36E, substantially horizontal light rays that travel from reflecting surfaces 2, 3, 34', 35', and 1e along light paths LA', LB', LC", LD", and LE are radiated forward, respectively.

In the light guide unit of FIGS. 8A and 8B, the radiating surfaces 36A, 36B, 36C, 36D, and 36E can be arranged in different planes, as shown in FIG. 8A. That is, a plurality of planes formed by the radiating surfaces 36A, 36B, 36C, 36D, and 36E form the radiating portion. A width in the up-and-down direction of the radiating portion of the light guide unit of the exemplary embodiment of FIGS. 8A and 8B may be set in the same manner as that of the width in the up-and-down direction of the radiating portion of the light guide unit of the exemplary embodiment shown in FIG. 2A. In this case, a distribution of the radiated light from a front face of the light guide unit is approximately the same as that from the light guide unit shown in FIG. 2A. The plurality of radiating surfaces may be designed to have different widths from each other depending on the purpose of the light guide unit.

In FIG. 8A, an optically insulating portion 37 can be arranged between the reflecting surface 2 and the reflecting surfaces 4 and 34', and an optically insulating portion 38 can be arranged between the reflecting surface 3 and the reflecting surfaces 5 and 35'. In this exemplary embodiment, the material forming the optically insulating portions 37 and 38 in the light guide unit is air. In other words, the reflecting surface 2 is separated from the reflecting surfaces 4 and 34' by the optically insulating portion 37 and the reflecting surface 3 is separated from the reflecting surfaces 5 and 35' by the optically insulating portion 38.

The radiating surface 36C can be arranged behind the radiating surface 36A, as shown in FIG. 8A. More specifically, the radiating surface 36C can be arranged at a front edge of the reflecting surface 34'. Therefore, according to the light guide unit of the exemplary embodiment of FIGS. 8A and 8B, the amount of the material required for manufacturing the light guide unit can be reduced, as compared with the light guide unit of the exemplary embodiment shown in FIG. 1A in which the radiating surface 6C is arranged on the same plane as the radiating surface 6A. This can be the same for the left half of the light guide unit of the exemplary embodiment of FIGS. 8A and 8B and therefore the description thereof is omitted.

Moreover, in the light guide unit of FIGS. 8A and 8B, light that is incident from the reflecting surface 4 on the reflecting surface 34' via the light path LC' can be reflected by the reflecting surface 34' to a right forward direction and then radiated from the radiating surface 36C. Light that is incident from the reflecting surface 5 on the reflecting surface 35' via the light path LD' can be reflected by the reflecting surface 35' to a left forward direction and then radiated from the radiating surface 36D. In other words, the light guide unit of the exemplary embodiment of FIGS. 8A and 8B can radiate light rays that are diffused to the right and left from right and left ends. More specifically, the light guide unit can be applied to an automotive rear light, a rear fog lamp, and the like that radiate light to the right and left.

In the exemplary embodiment of FIGS. 8A and 8B, the fourth reflecting portion and the fifth reflecting portion can be arranged to radiate light rays to left and right diffusion directions, respectively. However, the disclosed subject matter is not limited thereto. For example, in a modification of the light guide unit of FIGS. 8A and 8B, the second reflecting portion may be formed to reflect horizontal light from the reflecting surface 1a to a right forward direction, and the third reflecting portion may be formed to reflect horizontal light from the reflecting surface 1b to a left forward direction.

Next, a light guide unit of another exemplary embodiment will be described with respect to FIG. 9. The basic structure of the light guide unit shown in FIG. 9 can be substantially the same as that of the exemplary embodiment described above with respect to FIG. 1. Therefore, the same or similar effects as those obtained by the aforementioned light guide unit of FIG. 1 can be obtained by the light guide unit of FIG. 9, including additional features as described below.

Figure 1B:
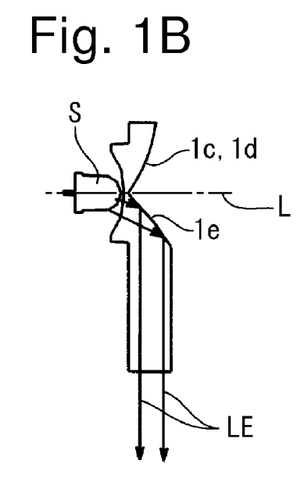
Figure 1C:
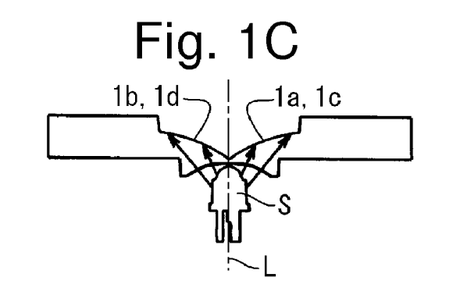
Figure 9:
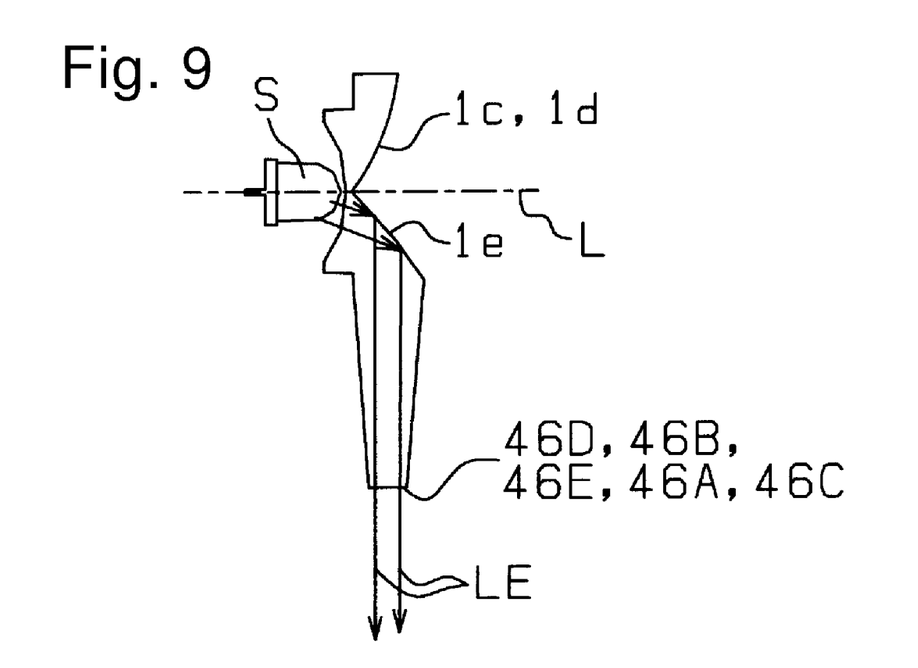
FIG. 9 is a cross-sectional view of another embodiment of a light guide unit with LED unit made in accordance with principles of the disclosed subject matter, as seen from a direction that is the same as that of FIG. 1B.

FIG. 9 shows the light guide unit with an LED unit and is a cross-sectional view similar to FIG. 1B. In FIG. 9, the same or similar parts as those in FIGS. 1A to 5 are labeled with the same reference numerals as those in FIGS. 1A to 5.

Radiating surfaces 46A to 46D are shown in FIG. 9. The exemplary embodiment of FIG. 9 can be the same as the exemplary embodiment of FIG. 1 in that the radiating surfaces 46A, 46B, 46C, 46D, and 46E can be arranged in the same plane and can be formed as a single plane. However, a width of each radiating surface in the up-and-down direction can be set to be smaller than that in the exemplary embodiment shown in FIG. 1B. Therefore, the light guide unit of the exemplary embodiment of FIG. 9 can radiate rectangular light having a smaller width in the up-and-down direction than that radiated by the light guide unit of the exemplary embodiment of FIG. 1.

Figure 10:
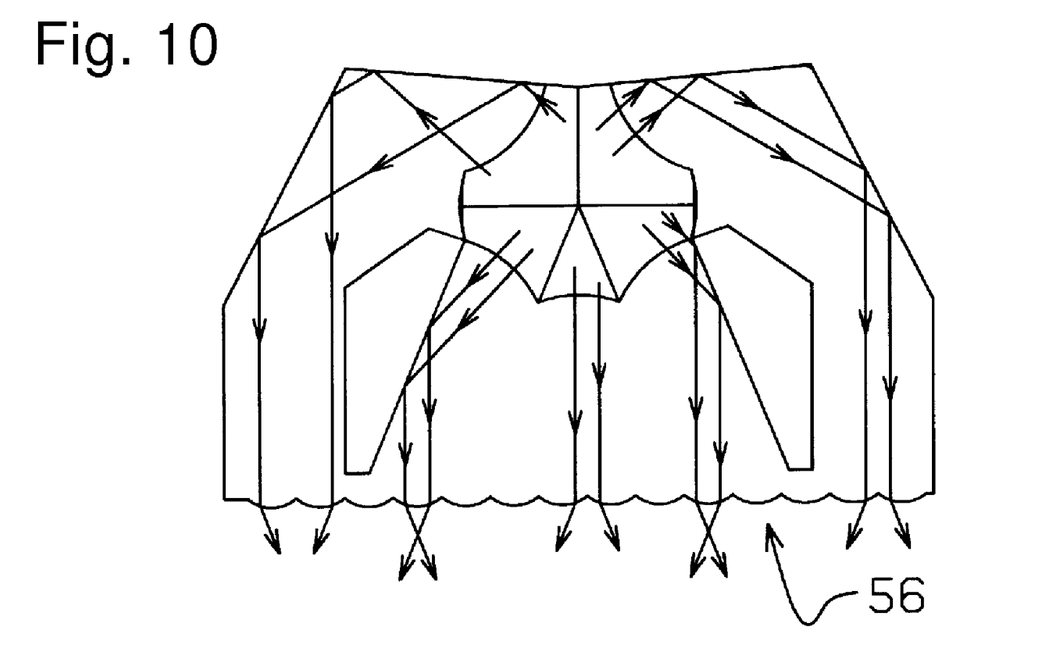
FIG. 10 is a plan view of another embodiment of a light guide unit made in accordance with principles of the disclosed subject matter showing light paths in the light guide unit.

FIG. 10 is a plan view of a light guide unit of yet another exemplary embodiment of the disclosed subject matter. The basic structure of the light guide unit and LED unit in the exemplary embodiment of FIG. 10 can be substantially the same as that in the exemplary embodiment of FIG. 1.

However, a lens cut can be provided in a radiating surface. The radiating surfaces 6A, 6B, 6C, 6D, and 6E can be formed in the same plane in the light guide unit of the exemplary embodiment of FIG. 1, whereas a convex lens cut can be formed in the radiating surface 56 in the light guide unit of the exemplary embodiment of FIG. 10. Due to the lens cut, a distribution of radiated light can be controlled as required. Please note that the disclosed subject matter is not limited thereto. Alternatively, a concave lens cut and a concavo-convex lens cut may be formed in the radiating surface.

Figure 11:
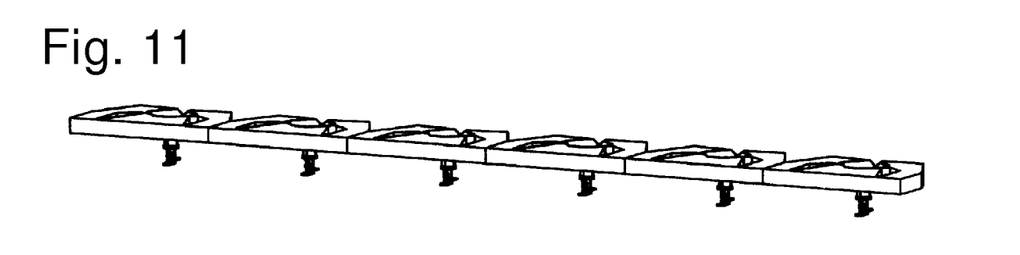
FIG. 11 is a perspective view of a light guide unit assembly in which six light guide units with LED units of FIG. 1 are arranged in a right-to-left direction.

A light guide unit assembly of the disclosed subject matter will now be described. FIG. 11 is a perspective view of a light guide unit assembly in which six light guide units of the exemplary embodiment shown in FIG. 1 along with their corresponding LED units are arranged in the right-to-left direction. The light guide unit assembly shown in FIG. 11 can radiate light in the form of a line. The light guide unit assembly shown in FIG. 11 can be applied to an automotive stop lamp, an automotive high mounted lamp, automotive signal lights, traffic lights, and the like.

Figure 12:
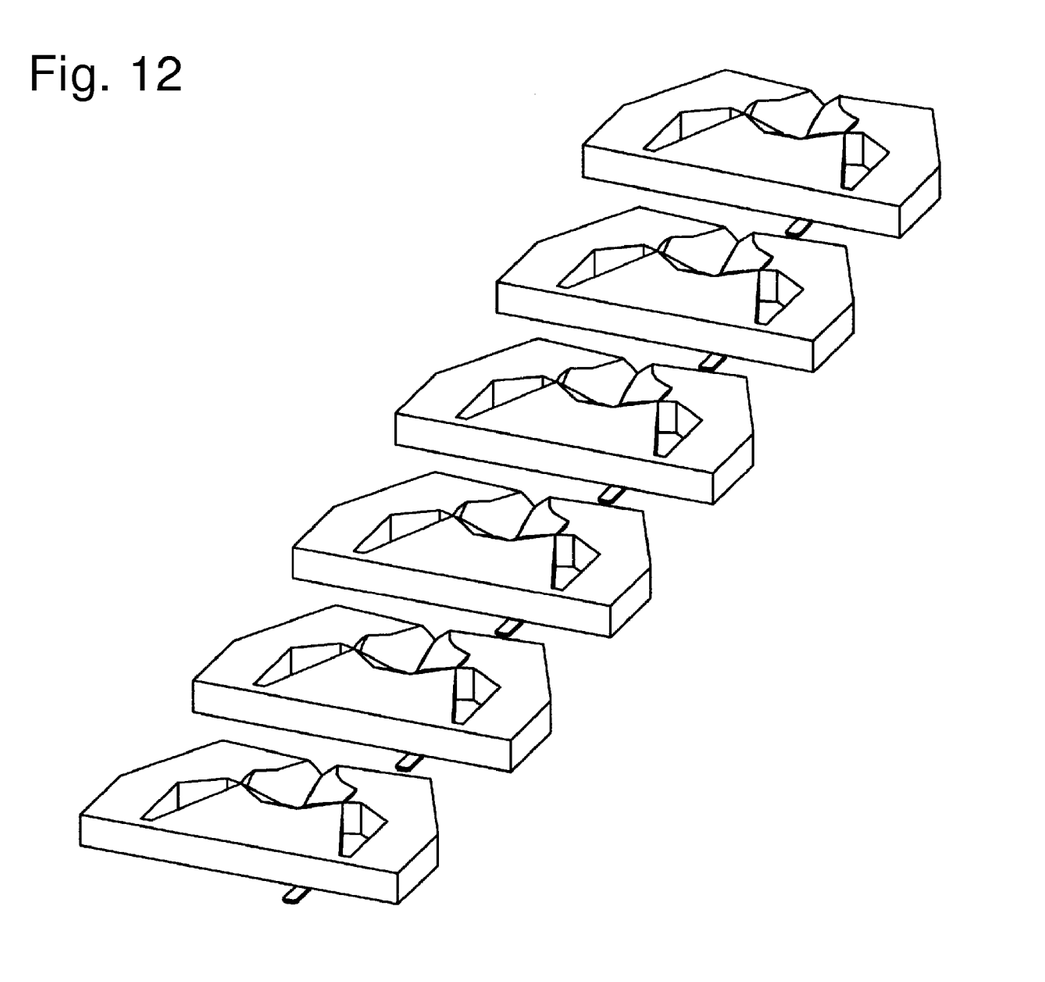
FIG. 12 is a perspective view of a light guide unit assembly in which six light guide units with LED units of FIG. 1 are arranged in a back-to-forth direction with offsets in an up-and-down direction.

FIG. 12 is a perspective view of a light guide unit assembly in which six of the light guide units of the exemplary embodiment of FIG. 1 along with their corresponding LED units are arranged in the back-to-forth direction with offsets in the up-and-down direction between the adjacent light guide units in a stepwise manner. This light guide unit assembly can radiate square light having a tone in accordance with designed arrangement (e.g., the offset amount in the up-and-down direction, or the back-to-forth direction). As described above, a light guide unit assembly composed of a plurality of light guide units and respective LED units can provide various light radiation modes that can be different from those of the conventional lighting device.

It is possible to combine the light guide units and the light guide unit assemblies according to the exemplary embodiments and their modifications in an appropriate manner. Since the reflecting surfaces can be formed to cause total reflection of incident light in the presently disclosed subject matter, it may not be necessary to perform surface treatment such as aluminum deposition for the reflecting surfaces. Moreover, the exemplary embodiments in which the radiated light is formed by parallel light is particularly suitable for an automotive lighting device in which a light distribution should be controlled. Therefore, the light guide unit and light guide unit assembly of the disclosed subject matter can be used in an automotive lighting device, a lighting device for a game machine, an illumination lighting device, and an ornamental lighting device, for example.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A light guide unit having at least one radiation direction in a direction substantially perpendicular to an optical axis of a light source, comprising:

a first reflecting portion that is configured to face the light source and includes a plurality of reflecting surfaces configured to reflect light incident thereon toward a plurality of directions substantially perpendicular to the optical axis;

a forward reflecting portion that is configured to reflect light that was reflected approximately toward the radiation direction by the first reflecting portion, toward the radiation direction as a forward direction;

a backward reflecting portion that is configured to reflect light that was reflected toward a backward direction opposite to the radiation direction by the first reflecting portion, substantially toward the radiation direction; and a radiating portion having at least one substantially rectangular radiating surface having a width in the optical axis direction that is smaller than a width perpendicular to the optical axis direction, wherein light from the forward reflecting portion and light from the backward reflecting portion are directed toward the radiation direction so that the radiating portion radiates the light from substantially its entire surface.

2. The light guide unit according to claim 1, wherein the first reflecting portion includes at least four reflecting surfaces configured to reflect light incident thereon toward a respective number of corresponding directions, the forward reflecting portion includes: a second reflecting portion having a reflecting surface configured to reflect light that was reflected by the first reflecting portion towards a forward right direction when the light guide unit is seen from the radiation direction, towards the radiation direction; and a third reflecting portion having a reflecting surface configured to reflect light that was reflected toward a forward left direction by the first reflecting portion, toward the radiation direction, the backward reflecting portion includes: a fourth reflecting portion having a reflecting surface configured to reflect light that was reflected toward the back right direction by the first reflecting portion, toward the radiation direction; and a fifth reflecting portion having a reflecting surface configured to reflect light that was reflected toward the back left direction by the first reflecting portion, toward the radiation direction, and the radiating portion includes a second radiating surface, a third radiating surface, a fourth radiating surface, and a fifth radiating surface each configured to radiate the light from the second reflecting portion, the light from the third reflecting portion, the light from the fourth reflecting portion, and the light from the fifth reflecting portion, respectively.

3. The light guide unit according to claim 2, wherein the reflecting surface of the second reflecting portion is formed by a first optically insulating portion located between a light path portion extending from the first reflecting portion to the radiating portion via the second reflecting portion and a light path portion extending from the first reflecting portion to the radiating portion via the fourth reflecting portion, and the reflecting surface of the third reflecting portion is formed by a second optically insulating portion located between a light path portion extending from the first reflecting portion to the radiating portion via the third reflecting portion and a light path portion extending from the first reflecting portion to the radiating portion via the fifth reflecting portion.

4. The light guide unit according to claim 3, wherein the first and second optically insulating portions are formed from a material having a different refractive index from that of a material forming at least one of the light path portions.

5. The light guide unit according to claim 3, wherein the first and second optically insulating portions are formed by air.

6. The light guide unit according to claim 1, wherein one of the plurality of reflecting surfaces of the first reflecting portion is a reflecting surface configured to reflect light incident thereon toward the radiation direction.

7. The light guide unit according to claim 2, wherein one of the plurality of reflecting surfaces of the first reflecting portion is a reflecting surface configured to reflect light incident thereon toward the radiation direction.

8. The light guide unit according to claim 6, wherein the reflecting surface of the first reflecting portion that reflects the incident light toward the radiation direction is arranged between the second reflecting portion and the third reflecting portion.

9. The light guide unit according to claim 7, wherein the reflecting surface of the first reflecting portion that reflects the incident light toward the radiation direction is arranged between the second reflecting portion and the third reflecting portion.

10. The light guide unit according to claim 2, wherein
the reflecting surface of the fourth reflecting portion includes a reflecting surface configured to reflect the light that was reflected towards a back right direction by the first reflecting portion, approximately towards a forward right radiation direction, and a reflecting surface configured to reflect the light that was reflected approximately towards the forward right radiation direction, towards the radiation direction, and
the reflecting surface of the fifth reflecting portion includes a reflecting surface configured to reflect the light that was reflected towards a back left direction by the first reflecting portion, approximately towards a forward left radiation direction, and a reflecting surface configured to reflect the light that was reflected approximately towards the forward left radiation direction, towards the radiation direction.

11. The light guide unit according to claim 3, wherein
the reflecting surface of the fourth reflecting portion includes a reflecting surface configured to reflect the light that was reflected towards a back right direction by the first reflecting portion, approximately towards a forward right radiation direction, and a reflecting surface configured to reflect the light that was reflected approximately towards the forward right radiation direction, towards the radiation direction, and
the reflecting surface of the fifth reflecting portion includes a reflecting surface configured to reflect the light that was reflected towards a back left direction by the first reflecting portion, approximately towards a forward left radiation direction, and a reflecting surface configured to reflect the light that was reflected approximately towards the forward left radiation direction, towards the radiation direction.

12. The light guide unit according to claim 2, wherein the radiating portion is formed substantially within the same plane.

13. The light guide unit according to claim 3, wherein the radiating portion is formed substantially within the same plane.

14. The light guide unit according to claim 2, wherein at least one of the second, third, fourth, and fifth radiating surfaces is formed within a plane that is different from a plane forming another one of the second, third, fourth, and fifth radiating surfaces.

15. The light guide unit according to claim 14, wherein the fourth radiating surface is located behind the second radiating surface.

16. The light guide unit according to claim 14, wherein the fifth radiating surface is located behind the third radiating surface.

17. A light guide unit assembly comprising a plurality of the light guide units according to claim 1 and arranged in a right-to-left direction.

18. A lighting device comprising the light guide unit according to claim 1.

19. A light guide unit having at least one radiation direction in a direction substantially perpendicular to an optical axis of a light source, comprising:
a first reflecting portion that is configured to face the light source and has at least four reflecting surfaces configured to reflect light incident thereon towards at least four different directions that are substantially perpendicular to the optical axis;
a forward reflecting portion including a second reflecting portion having a reflecting surface configured to reflect light that was reflected by the first reflecting portion towards a forward right direction when the light guide unit is seen from the radiation direction, towards the radiation direction, and a third reflecting portion having a reflecting surface configured to reflect light that was reflected towards a forward left direction by the first reflecting portion, toward the radiation direction;
a backward reflecting portion including a fourth reflecting portion having a reflecting surface configured to reflect light that was reflected by the first reflecting portion towards a back right direction, towards the radiation direction, and a fifth reflecting portion having a reflecting surface configured to reflect light that was reflected towards a back left direction by the first reflecting portion, towards the radiation direction; and
a rectangular radiating portion that has a width in an up-and-down direction that is less than a width in a direction perpendicular to the up and down direction, and includes at least a second radiating surface, a third radiating surface, a fourth radiating surface, and a fifth radiating surface that are configured to radiate the light from the second reflecting portion, the light from the third reflecting portion, the light from the fourth reflecting portion, and the light from the fifth reflecting portion, respectively, wherein the light from the forward reflecting portion and the light from the backward reflecting portion is directed towards the radiation direction, the radiating portion being configured to radiate light from substantially its entire surface, wherein
the reflecting surface of the second reflecting portion is formed by a first optically insulating portion located between a light path portion extending from the first reflecting portion to the radiating portion via the second reflecting portion and a light path portion extending from the first reflecting portion to the radiating portion via the fourth reflecting portion, and
the reflecting surface of the third reflecting portion is formed by a second optically insulating portion located between a light path portion extending from the first reflecting portion to the radiating portion via the third reflecting portion and a light path portion extending from the first reflecting portion to the radiating portion via the fifth reflecting portion.

20. A light guide unit assembly comprising a plurality of the light guide units according to claim 19 and arranged in a right-to-left direction.

21. A lighting device comprising the light guide unit according to claim 19.

22. The light guide unit according to claim 17, wherein all of the light from the forward reflecting portion and the light from the backward reflecting portion is directed toward the radiation direction.

* * * * *